(12) United States Patent
Sunada et al.

(10) Patent No.: US 6,554,713 B2
(45) Date of Patent: Apr. 29, 2003

(54) COUPLING FOR COUPLING TWO SHAFTS

(75) Inventors: Hideki Sunada, Kanagawa (JP); Takayuki Yokota, Kanagawa (JP)

(73) Assignee: Unisia Jecs Corporation, Atsugi (JP)

( * ) Notice: Subject to any disclaimer, the term of this patent is extended or adjusted under 35 U.S.C. 154(b) by 0 days.

(21) Appl. No.: 09/919,993

(22) Filed: Aug. 2, 2001

(65) Prior Publication Data

US 2002/0022527 A1 Feb. 21, 2002

(30) Foreign Application Priority Data

Aug. 2, 2000 (JP) .................................. 2000-233848

(51) Int. Cl.$^7$ ............................................. F16D 3/79
(52) U.S. Cl. .................................. 464/99; 29/DIG. 23
(58) Field of Search ........................ 464/93–95, 98, 464/99, 137; 29/DIG. 23, DIG. 46; 277/595

(56) References Cited

U.S. PATENT DOCUMENTS

| | | | | |
|---|---|---|---|---|
| 1,466,238 A | * | 8/1923 | MacDonald | 464/95 X |
| 1,947,052 A | * | 2/1934 | Lack | 464/99 |
| 2,182,711 A | * | 12/1939 | Thomas | 464/99 |
| 3,067,596 A | * | 12/1962 | Caunt | 464/71 |
| 4,214,457 A | * | 7/1980 | Wade et al. | 464/99 |
| 4,457,737 A | * | 7/1984 | Sharples | 464/99 |
| 4,482,335 A | * | 11/1984 | Goody | 464/99 X |
| 4,714,260 A | * | 12/1987 | Udagawa | 277/595 |

FOREIGN PATENT DOCUMENTS

| | | | | |
|---|---|---|---|---|
| JP | 60-189620 | | 12/1985 | |
| JP | 63-178632 | | 11/1988 | |
| SU | 1379514 | A1 * | 3/1988 | 464/99 |
| SU | 1746082 | A1 * | 7/1992 | 464/99 |

* cited by examiner

*Primary Examiner*—Greg Binda
(74) *Attorney, Agent, or Firm*—Foley & Lardner

(57) ABSTRACT

A coupling for coupling first and second shafts is described. The coupling comprises an annular unit including a plurality of annular metal plates which are put on one another, a first group of bolt bores formed through the annular unit, a second group of bolt bores formed through the annular unit, a first group of bolts and nuts which are incorporated with the first group of bolt bores to fix the annular metal plates, a second group of bolts and nuts which are incorporated with the second group of bolt bores to fix the annular metal plates, a first yoke which connects the first shaft to the first group of bolts and nuts, and a second yoke which connects the second shaft to the second group of bolts and nuts. A stopper structure is further provided by which every mutually contacting portions of the annular metal plates are suppressed from making a relative displacement therebetween.

8 Claims, 10 Drawing Sheets

COUPLING FOR COUPLING TWO SHAFTS

BACKGROUND OF THE INVENTION

1. Field of the Invention

The present invention relates in general to couplings, such as a coupling employed in a propeller shaft and the like for motor vehicles, and more particularly to the couplings of a type that can effectively absorb an axial vibration under operation thereof.

2. Description of Related Art

Hitherto, various couplings for coupling two shafts have been proposed and put into practical use. One of them is disclosed in Japanese Utility Model First Provisional Publication 60-189620 (the "'620 publication"), which employs a plurality of generally annular metal plates intimately put on one another to constitute a vibration absorbing unit. However, some known couplings, including the coupling of the '620 publication, have failed to exhibit satisfactory vibration absorbing performance due to their inherent constructions. In fact, the coupling of the '620 publication, the united annular metal plates tend to cause undesirable relative displacement between mutually contacting portions thereof, particularly when a predetermined force is applied thereto when assembling the coupling.

SUMMARY OF THE INVENTION

Therefore, an object of the present invention is to provide a coupling for coupling two shafts, which is free of the above-mentioned shortcoming of the known couplings.

According to the present invention, there is provided a coupling for coupling two shafts, which can exhibit satisfactory vibration absorbing performance irrespective of its simple construction.

According to the present invention, there is provided a coupling for coupling first and second shafts, which comprises an annular unit including a plurality of annular metal plates which are put on one another; a first group of bolt bores formed through the annular unit; a second group of bolt bores formed through the annular unit; a first group of bolts and nuts which are incorporated with the first group of bolt bores to fix the annular metal plates; a second group of bolts and nuts which are incorporated with the second group of bolt bores to fix the annular metal plates; a first yoke which connects the first shaft to the first group of bolts and nuts; a second yoke which connects the second shaft to the second group of bolts and nuts; and a stopper structure by which mutually contacting portions of the annular metal plates are suppressed from making a relative displacement therebetween.

Other objects of the present invention will become apparent from the following description when taken in conjunction with the accompanying drawings.

DETAILED DESCRIPTION OF THE EMBODIMENTS

In the following, the present invention will be described in detail with reference to the accompanying drawings. For ease of understanding, various directional terms, such as, right, left, upper, lower, rightward, etc., are used in the description. However, such terms are to be understood with respect to only a drawing or drawings on which the corresponding part or portion is illustrated.

Referring to FIGS. 1 to 4, there is shown a coupling 100 which is a first embodiment of the present invention.

The coupling 100 will be described as being a part practically applied to a propeller shaft for a motor vehicle.

Figure 1A:
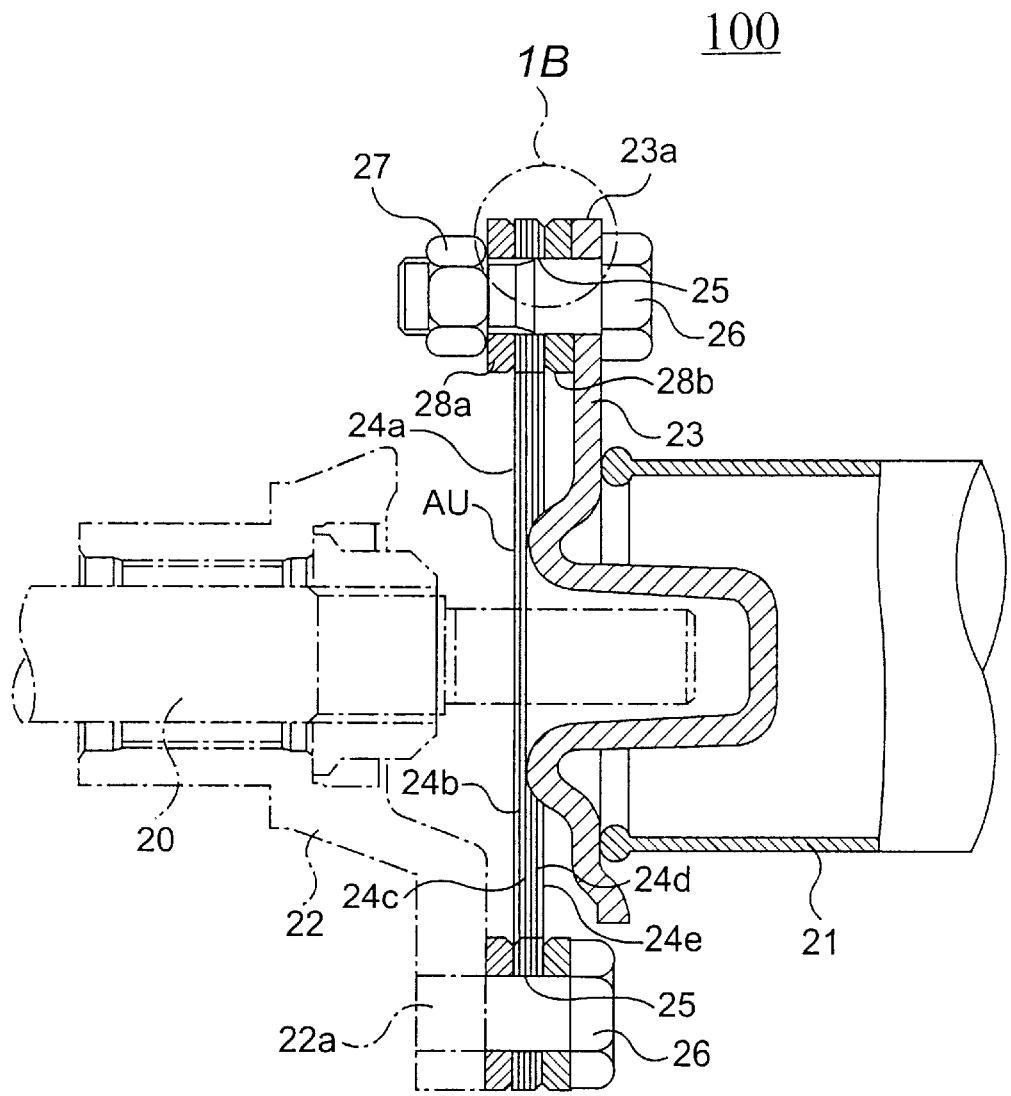
FIG. 1A is a sectional view of a coupling which is a first embodiment of the present invention.

FIG. 1A shows a sectional view of the propeller shaft. Denoted by numeral 20 is a first shaft, such as an output shaft of a transmission of the vehicle, and denoted by numeral 21 is a second shaft, such as a shaft body of the propeller shaft.

The first shaft 20 is provided at its leading end with a cast yoke 22. While, the second shaft 21 is provided at its leading end with a pressed yoke 23. Welding is used for securing the yoke 23 to the second shaft 21. Each of the yokes 22 and 23 is formed with three branched arms 22a or 23a each having a connecting end.

Between the yokes 22 and 23, there is disposed an annular unit "AU" consisting of five annular metal plates 24a–24e which are concentrically joined or put on one another. The two yokes 22 and 23 are connected to each other through the annular unit "AU" in such a manner as will be described in detail hereinafter.

Figure 2A:
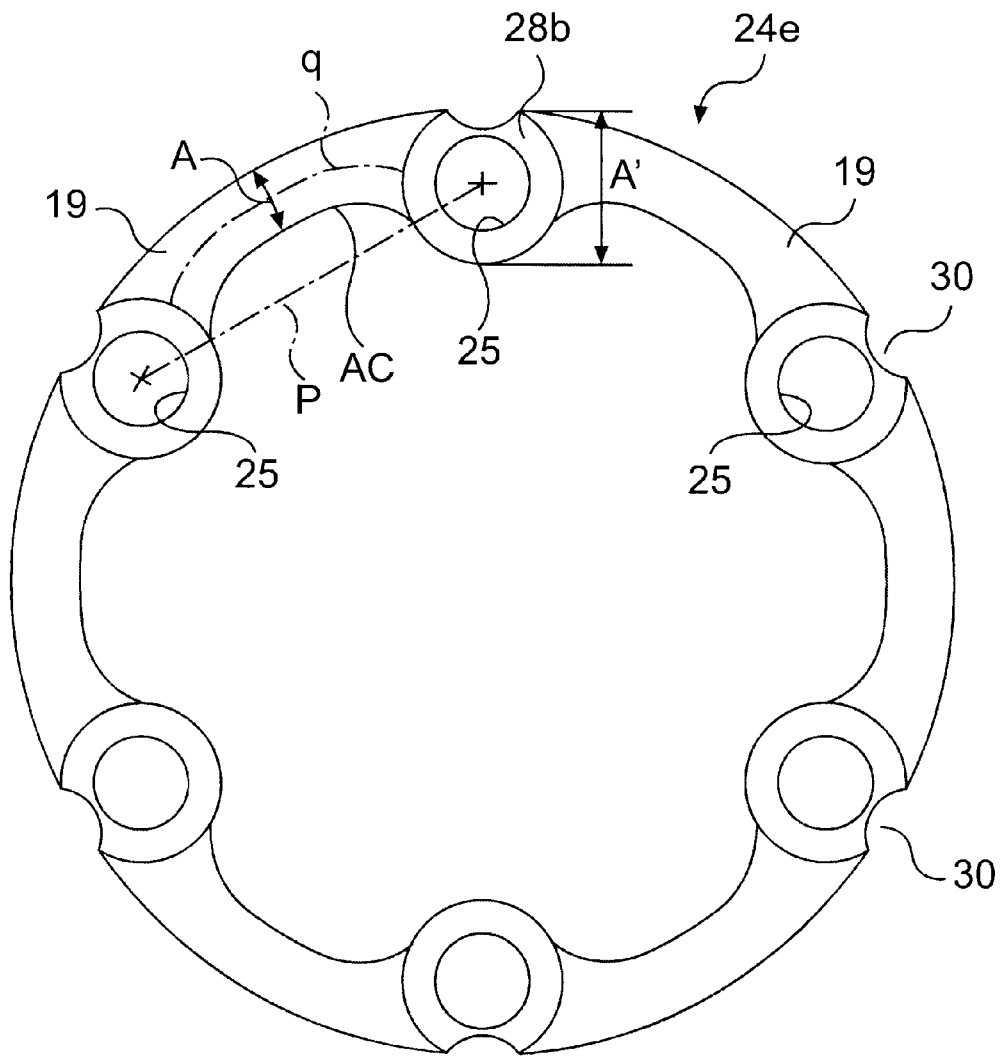
FIG. 2A is a plan view of a leftmost annular metal plate employed in the coupling of the first embodiment.
Figure 2B:
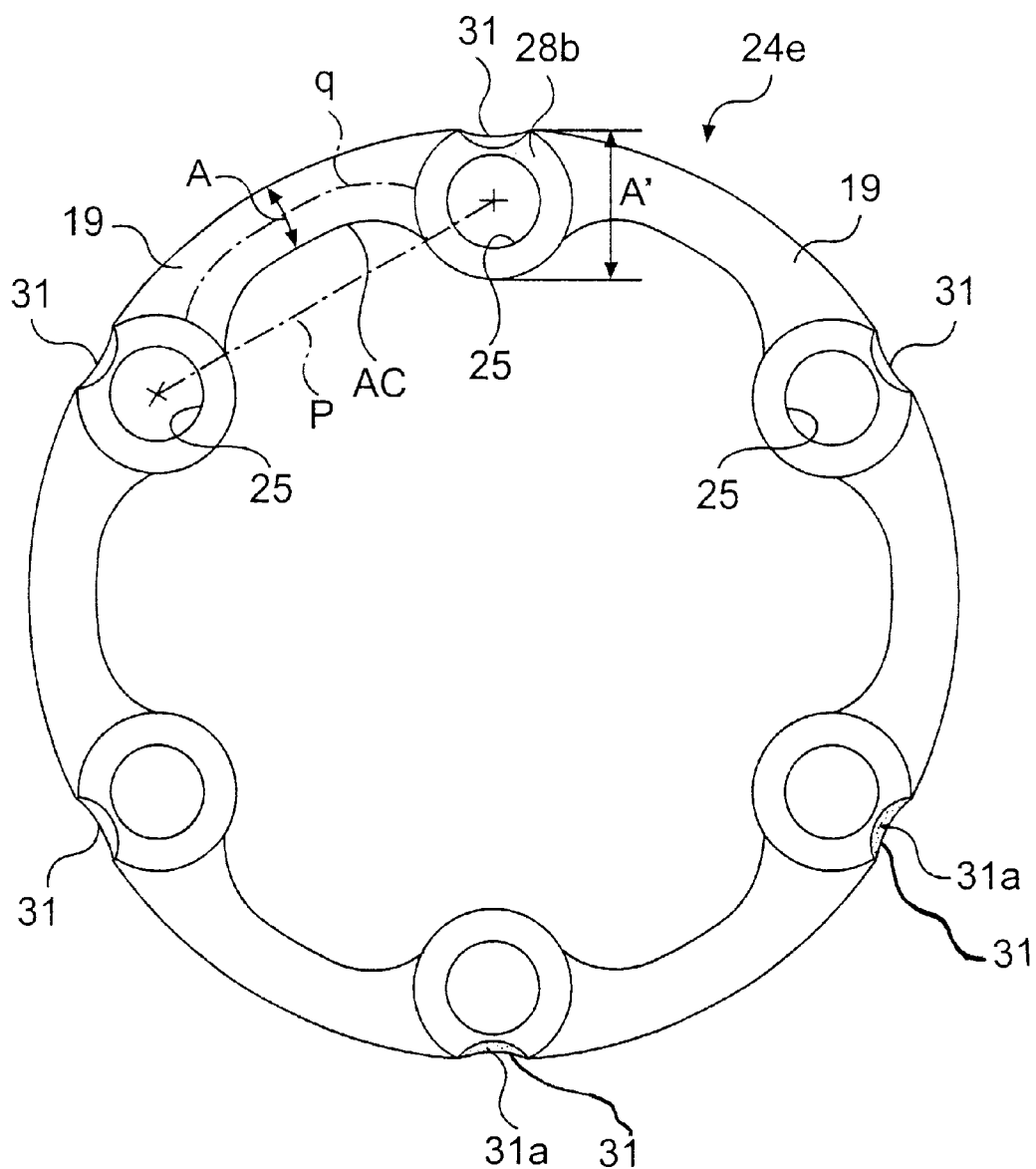
FIG. 2B is a plan view of the four remaining plates which along with the leftmost plate form an annual unit of the coupling.

As is seen from FIGS. 2A and 2B, the five annular metal plates 24a–24e are each formed with six circular openings 25 which are circumferentially arranged at evenly spaced intervals. Thus, when the five annular metal plates 24a–24e are properly united to constitute the annular unit "AU", six through bores (25) are defined in the unit "AU", which are circumferentially arranged at evenly spaced intervals.

Similar to the above-mentioned known couplings, the three branched arms 22a of the yoke 22 of the first shaft 20 are connected to one group of the bores (25) by means of bolts 26 and nuts 27, while the three branched arms 23a of the yoke 23 of the second shaft 21 are connected to the other group of the bores (25) by means of the bolts 26 and nuts 27. Each of the groups consists of the three bores (25) which are positioned alternately.

As is seen from FIG. 1, for bolting the branched arms 22a or 23a to the annular unit "AU" of the metal plates 24, paired washers 28a and 28b are used in such a manner as to directly put therebetween the annular unit "AU".

As is seen from FIGS. 2A and 2B, the six openings 25 of each annular metal plate 24 are each surrounded by an annular rim area that is shaped identical to the washer 28b.

The diameter of the annular rim area is denoted by "A". Each connecting arm portion 19 of the metal plate 24 by which two neighboring annular rim areas are connected has a middle portion whose width (i.e., radial length) is denoted by "A". As shown, the width "A" is smaller than the diameter "A", and both sides of the inner periphery of the connecting arm portion 19 are gradually enlarged to merge smoothly with the neighboring annular rim areas.

For producing the annular metal plates 24a–24e, metal stamping is used. As shown in FIGS. 2A and 2B, the metal stamping is so made that an arcuate cut "AC" is left radially outside with respect to an imaginary line "p" that connects respective centers of the neighboring two openings 25. Thus, the center line "q" of each connecting arm portion 19 is largely swelled radially outward, as shown. With this structure and shape, each annular metal plate 24a–24e can have a desired flexural rigidity in an axial direction, which is sufficiently small.

In addition to the above, a so-called stopper structure (32) is employed in the present invention, which suppresses a relative displacement between mutually contacting portions of the annular metal plates 24a–24e of the annular unit "AU", particularly at areas where the bores (25) are formed.

Figure 1B:
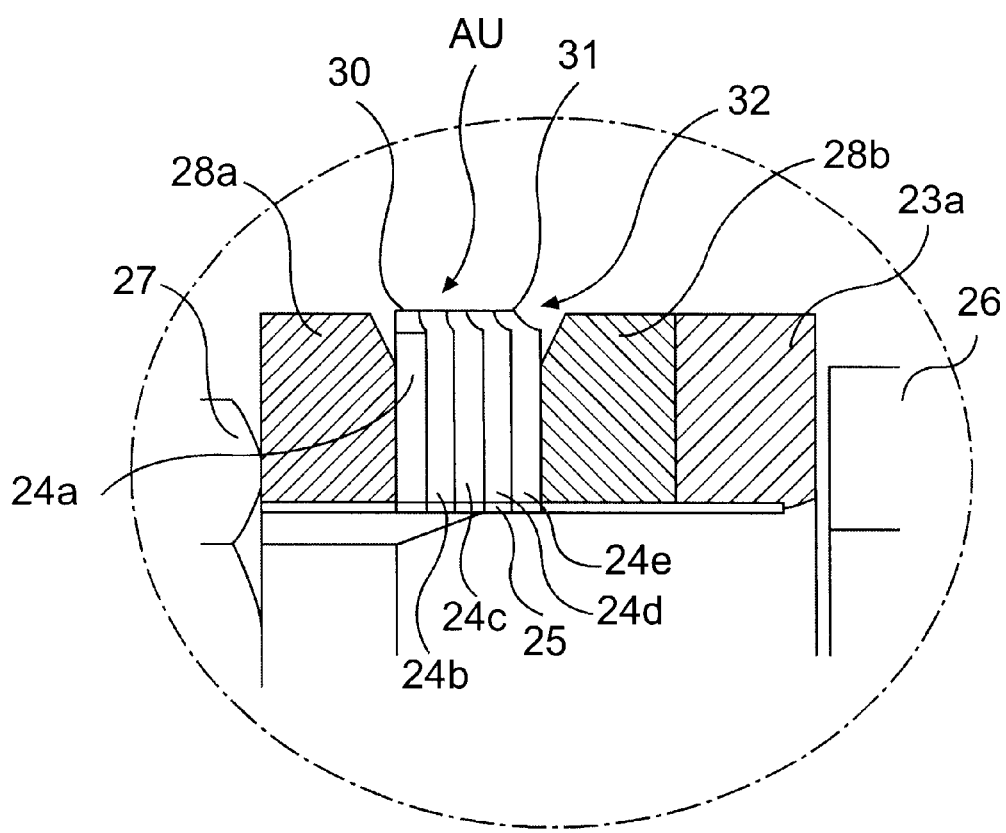
FIG. 1B is a blown-up area of FIG. 1A.
Figure 4:
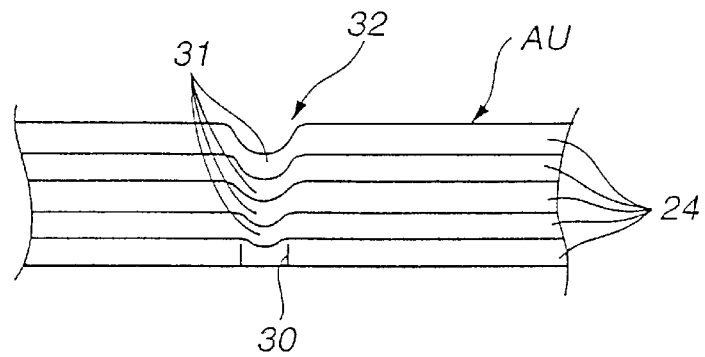
FIG. 4 is an enlarged side view of an essential part of the coupling of the first embodiment.

That is, as is seen from the encircled enlarged view in FIG. 1B, the annular unit "AU" has a caulked portion 32 at a radially outside portion of each through bore (25). More specifically, as is seen from FIGS. 2A, 3A and 4, the leftmost annular metal plate 24a is formed with six semicircular cuts 30 at radially outside portions of the six circular openings 25 respectively. By way of contrast, as shown in FIGS. 2B and 4, the other four annular metal plates 24b–24e each have six radially outside portions 31 of the six circular openings 25 pressed toward the cuts 30. Further, some or all of the outside portions 31 may have a scabrous surface 31a to enhance the engagement therebetween. As is seen from FIG. 3A, each semicircular cut 30 of the leftmost annular metal plate 24a is formed at an outer periphery of the plate 24, and as is seen from FIG. 4, the radially outside portions 31 of the other four metal plates 24 are depressed toward the cut 30. That is, the annular unit "AU" is formed at six evenly spaced portions of a periphery thereof with respective caulked portions 32, each being positioned near the bore (25). Due to provision of these caulked portions 32, undesirable relative displacement between every mutually contacting portions of the annular metal plates 24a–24e of the annular unit "AU" at the areas where the bores (25) are provided is suppressed.

Figure 3A:
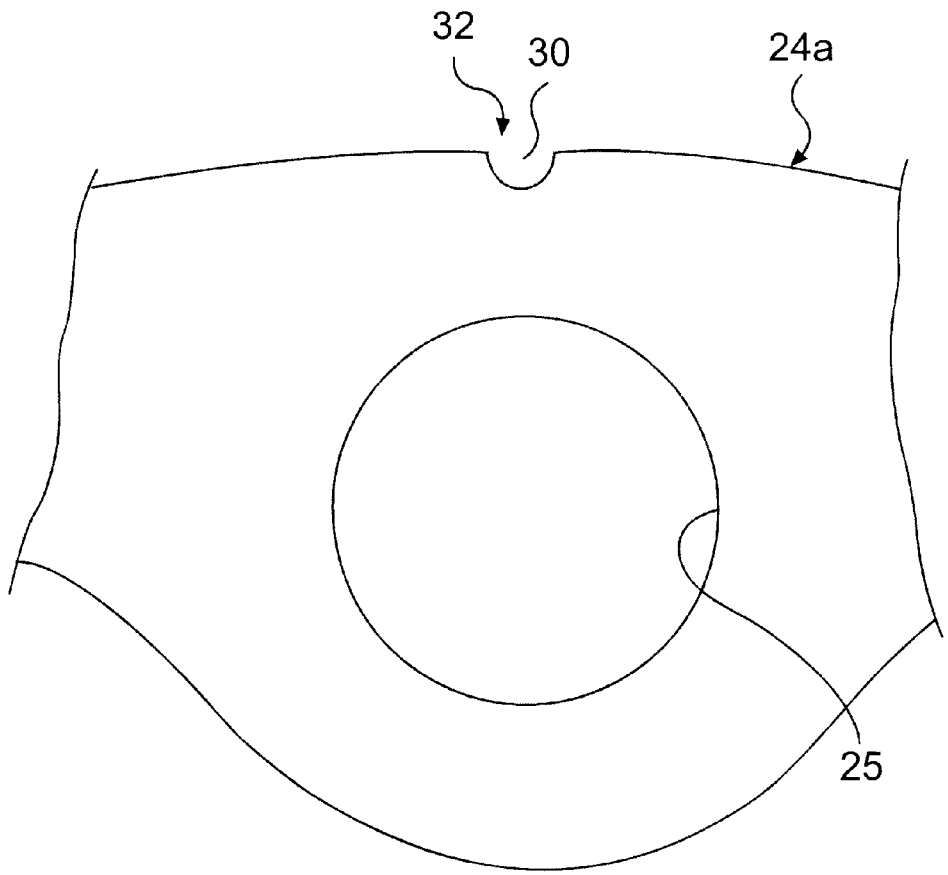
FIG. 3A is an enlarged plan view of an essential part of the leftmost annular metal plate of FIG. 2A.
Figure 3B:
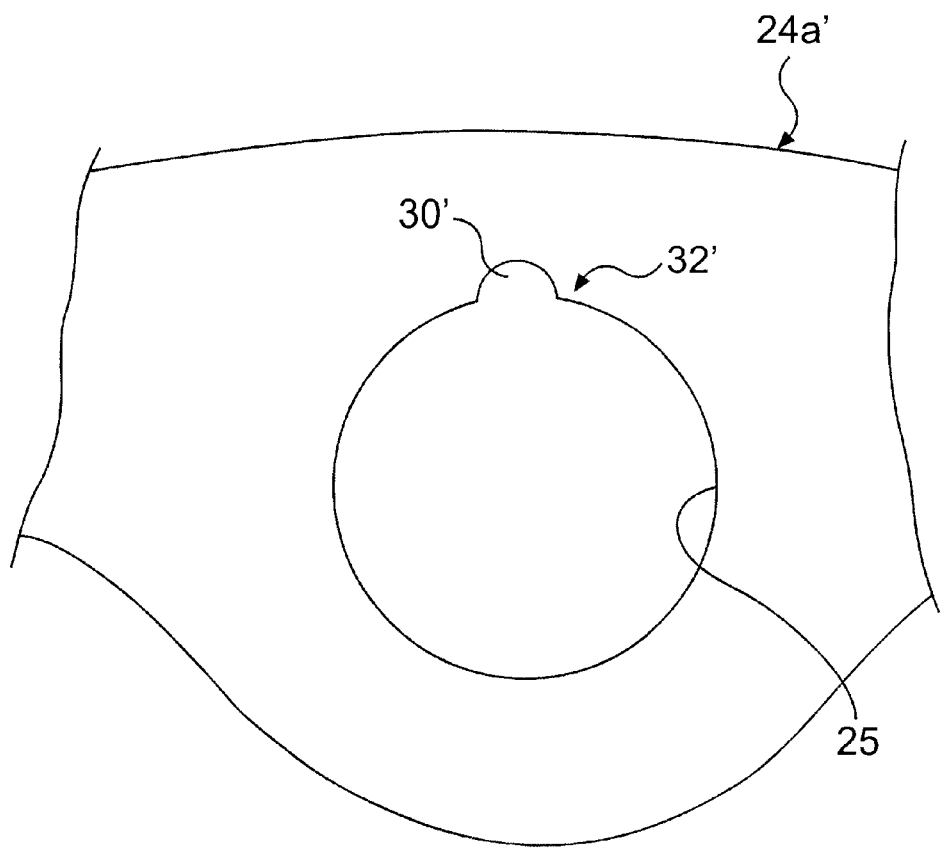
FIG. 3B is a first alternate embodiment of the leftmost annular metal plate.
Figure 3C:
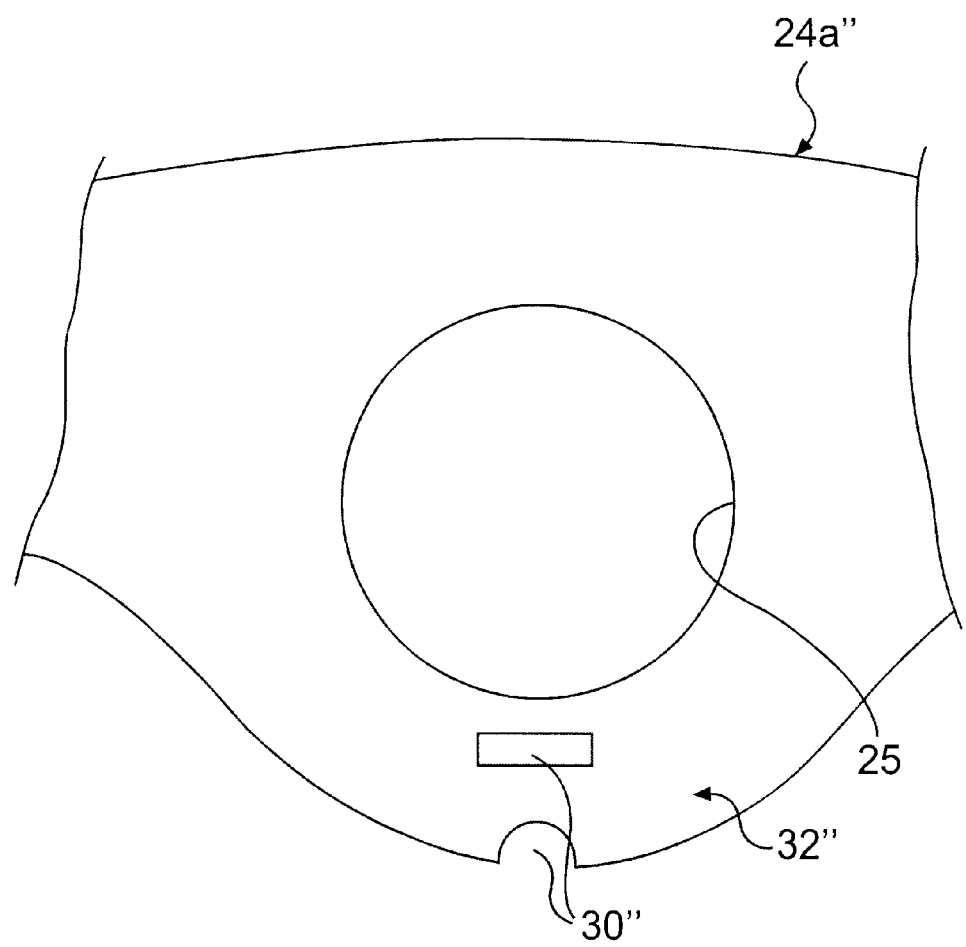
FIG. 3C is a second alternate embodiment of the leftmost annular metal plate.

If desired, positions where the caulked portions 32 are provided may change. That is, as shown in FIG. 3B, such portions may be provided at areas denoted by numeral 32' for an alternate leftmost plate 24a'. Similarly, as shown in FIG. 3C, such portions may be provided at areas denoted by numeral 32" for an alternate leftmost plate 24a". In the case of the caulked portion 32', the cut 30' (and the corresponding depressed portions not shown) is positioned at an inner wall of the bore (25). In the case of the caulked portion 32", the cut 30" (and the corresponding depressed portions not shown) is positioned radially inside of the bore (25).

Thus, when, as is seen from FIG. 1, the first shaft 20 is rotated, the torque of the shaft 20 is transmitted to the annular unit "AU" through the three branched arms 22a of the yoke 22, and to the second shaft 21 through the three branched arms 23a of the yoke 23. Any axial vibration or displacement occurring between the first and second shafts 20 and 21 during this torque transmission is absorbed by an axial resilient deformation of the annular unit "AU".

In the above-mentioned first embodiment 100 of the present invention, the following advantages are obtained.

First, due to the above-mentioned stopper structure (32), relative displacement between the mutually contacting metal plates 24a–24e of the annular unit "AU" at the area where the bores (25) are formed is assuredly suppressed, and thus, even if the bolts 26 (see FIG. 1) are tightly engaged with the nuts 27, an undesired expanding phenomenon of the outermost metal plates 24, such as that shown in FIG. 11, is suppressed. Thus, in the invention, each of the metal plates 24 can be sufficiently thinned, thereby improving the vibration absorbing effect of the coupling 100.

Second, because the caulked portions 32 constituting the stopper structure (32) are positioned near the bores (25), the vibration absorbing ability possessed by the connecting arm portions 19 possessed by each metal plate 24 is not affected, thereby promoting the vibration absorbing effect of the coupling 100.

Third, the stopper structure (32) is provided by only cutting or pressing given portions of the annular metals plates 24a–24e without using separate parts. Thus, simple, light-weight and non-costly production may be achieved.

Figure 5:
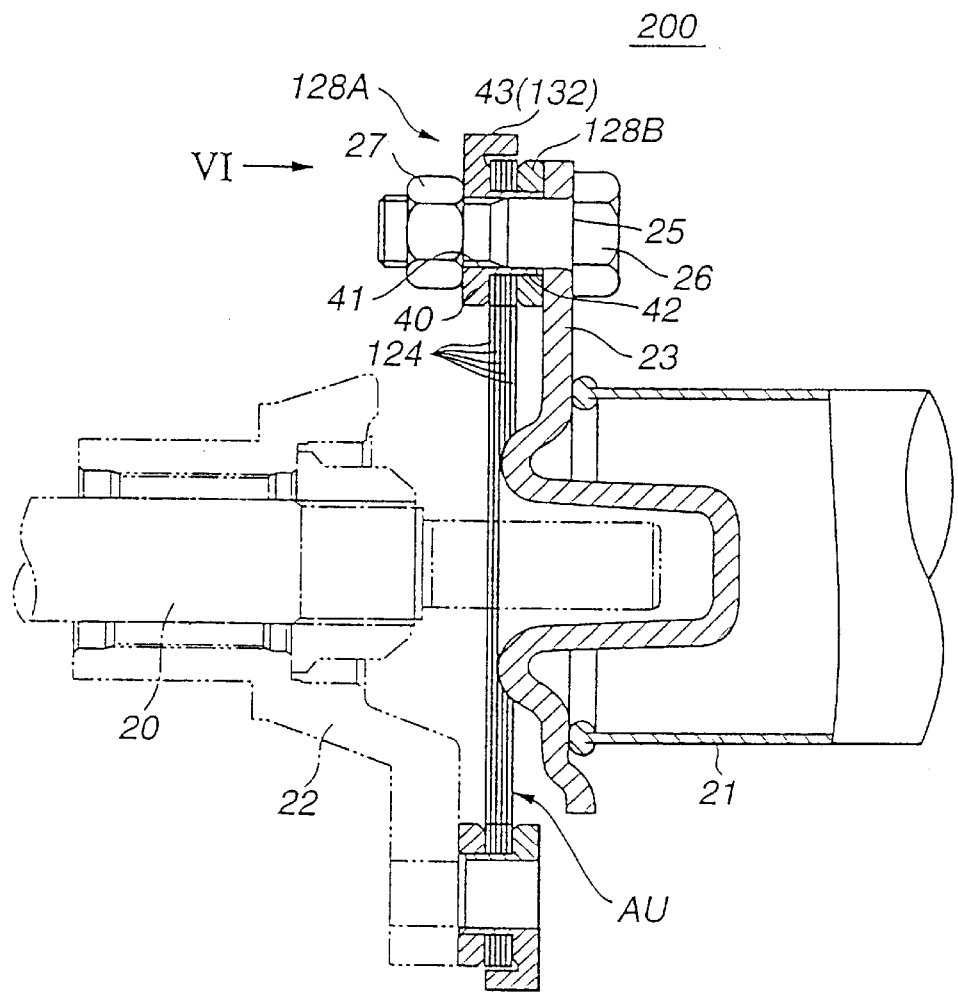
FIG. 5 is a view similar to FIG. 1, but showing a second embodiment of the present invention.
Figure 6:
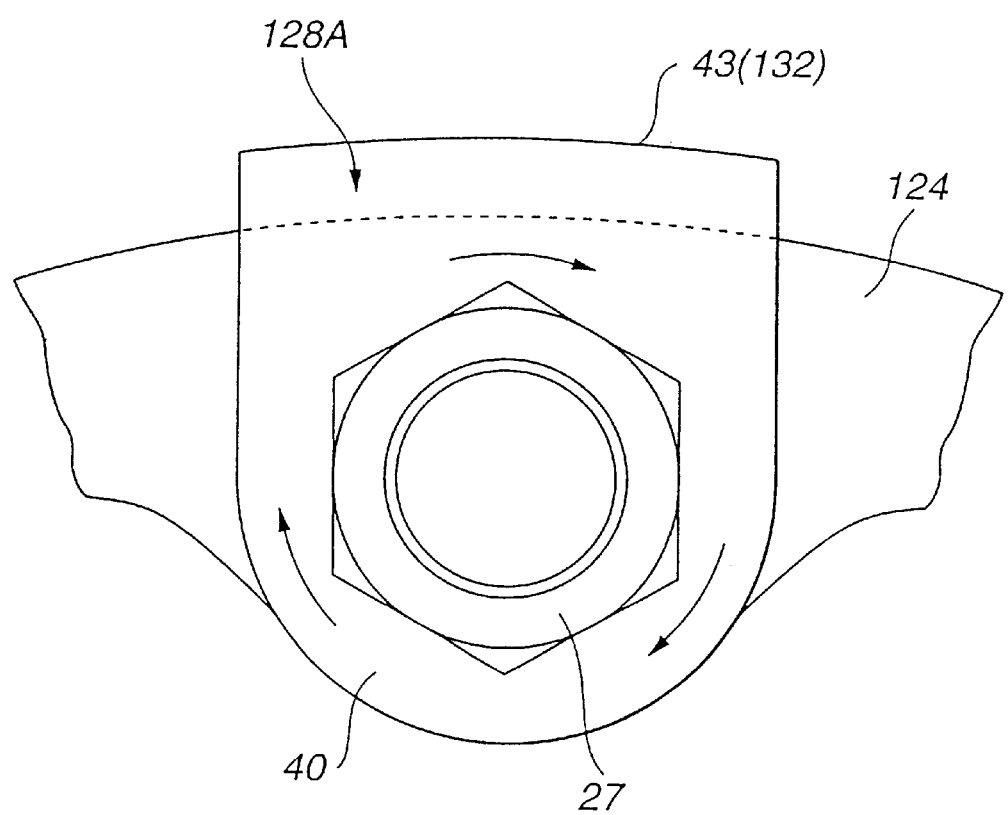
FIG. 6 is an enlarged front view of a part indicated by the arrow "VI" of FIG. 5.

Referring to FIGS. 5 and 6, there is shown a coupling 200 which is a second embodiment of the present invention.

Substantially same parts and constructions as those of the above-mentioned first embodiment 100 are denoted by the same numerals and detailed explanation of such parts and constructions will be omitted from the following description for facilitation of the same.

In this second embodiment 200, in place of the stopper structure (32) employed in the first embodiment 100, a stopper device 132 is used for suppressing the relative displacement between mutually contacting portions of annular metal plates 124 of the annular unit "AU" particularly at areas where the bores (25) are formed.

That is, as is seen from FIG. 5, six pairs of washers 128A and 128B are used, which are respectively incorporated with the six bores (25) of the annular unit "AU" through the six pairs of bolts 26 and nuts 27 in such a manner as will be described in the following.

As is seen from FIGS. 5 and 6, the washer 128A of each pair comprises a flat seat portion 40 with a circular opening 41, a tubular portion 42 protruding from the flat seat portion 40 and an arcuate stopper portion 43 formed on a peripheral part of the flat seat portion 40. A cylindrical bore of the tubular portion 42 is merged the circular opening 41 of the flat seat portion 40, and the arcuate stopper portion 43 projects in the same direction as the tubular portion 42. As is seen from FIG. 5, the tubular portion 42 is sized to be intimately inserted into the corresponding bore (25) of the annular unit "AU", and the cylindrical bore of the tubular portion 42 is sized to intimately receive therein the corresponding bolt 26. The length of the tubular portion 42 is larger than the thickness of the annular unit "AU". However, the length of the tubular portion 42 is smaller than a sum of the thickness of the annular unit "AU" and the thickness of the other washer 128B, for the reasons which will become apparent as the description proceeds. The other washer 128B of each pair is of a common annular washer.

As is seen from FIG. 5, in assembly, the washer 128A of each pair is intimately received at the tubular portion 42 thereof in the corresponding bore (25) of the annular unit "AU" having the arcuate stopper portion 43 thereof intimately cover the outer periphery of the annular unit "AU". The other washer 128B is put on the exposed leading part of the tubular portion 42, as shown. Each bolt 26 is inserted through the cylindrical bore of the tubular portion 42, and the corresponding nut 27 is tightly engaged with the bolt 26 to finally assemble the coupling 200.

In the above-mentioned second embodiment 200 of the invention, due to provision of the stopper device 132, undesired relative displacement between the mutually contacting metal plates 124 of the annular unit "AU" at the area where the bores (25) are formed is assuredly suppressed.

That is, as is seen from FIG. 6, even if such relative displacement is about to occur due to tight turning of the bolt 26 or the nut 27, the arcuate stopper portion 43 of each washer 128A stops such displacement. In order to effectively stop such displacement, each arcuate stopper portion 43 should have a concave surface whose radius of curvature is substantially the same as that of the cylindrical outer surface of the annular unit "AU".

Figure 7:
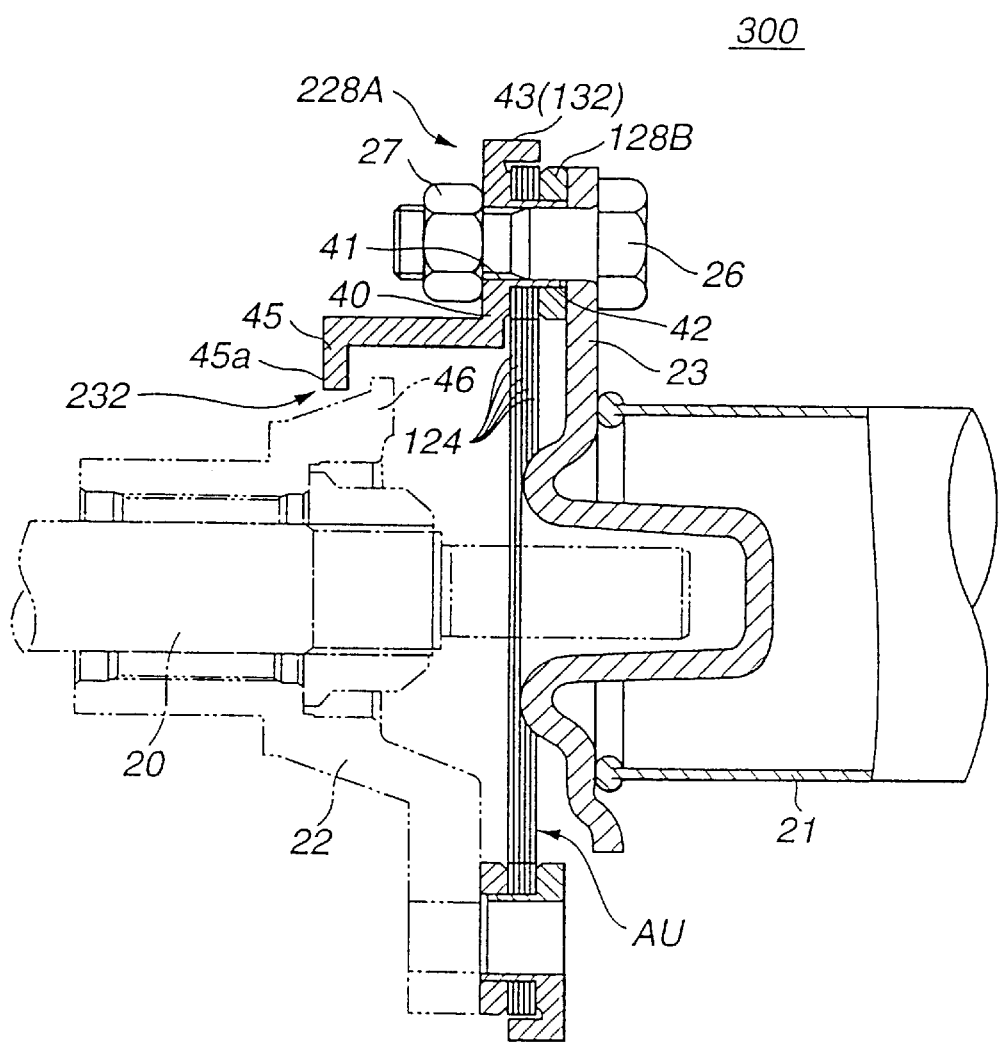
FIG. 7 is a view similar to FIG. 5, but showing a third embodiment of the invention.

Referring to FIG. 7, there is shown a coupling 300 which is a third embodiment of the invention.

Since this third embodiment 300 is similar to the above-mentioned second embodiment 200, only parts and portions different from those of the second embodiment 200 will be described in detail in the following.

That is, in the third embodiment 300, another stopper device 232 is further provided by which an excessive axial displacement between the first and second shafts 20 and 21 is suppressed.

As is seen from the drawing, each washer 228A, which corresponds to each washer 128A of the second embodiment 200, is further formed with a stopper arm 45 which extends axially toward the first shaft 20. As shown, the stopper arm 45 has a leading end 45a bent radially inward. The yoke 22 of the first shaft 22 is formed with six projections 46 (only one is shown) which are arranged about an axis of the first shaft 22 at equally spaced intervals. As shown, each projection 46 is positioned behind the bent end 45a of the corresponding stopper arm 45.

Thus, when, due to some reasons, the first and second shafts 20 and 21 are axially moved away from each other by a certain distance, the projections 46 and the bent ends 45a of the stopper arms 45 become into contact with each other thereby to suppress the excessive displacement between the two shafts 20 and 21. Thus, excessive deformation of the annular metal plates 124 is suppressed.

In the following, modifications of the present invention will be described.

In the above-mentioned second and third embodiments 200 and 300, the stopper device 132 is constructed to cover or contact the outer periphery of the annular unit "AU". However, if desired, the stopper device may be constructed to cover or contact an inner periphery of the annular unit "AU". Furthermore, if desired, the arcuate stopper portion 43 may be integrally formed on each bolt 26 or nut 27.

Furthermore, in place of the above-mentioned stopper devices 32 and 132, a measure of providing each annular metal plate 24 or 124 with scabrous surfaces may be used. If desired, this measure may be applied to only an annular area around the opening 25 of each metal plate 24 or 124. Furthermore, such measure may be applied to only one surface of each metal plate 24 or 124 so long as a mated metal plate 24 or 124 has a scabrous surface on the mating side. Furthermore, such measure may be also applied to the washer 28a, 28b, 128A, 128B or 228A. Due to such measure, a friction resistance between every mutually contacting portions of the annular metal plates 24 or 124 is increased and relative displacement therebetween is suppressed or at least minimized.

The entire contents of Japanese Patent Application 2000-233848 (filed Aug. 2, 2000) are incorporated herein by reference.

Although the invention has been described above with reference to the embodiments of the invention, the invention is not limited to such embodiments as described above. Various modifications and variations of such embodiments may be carried out by those skilled in the art, in light of the above descriptions.

What is claimed is:

1. A coupling for coupling first and second shafts, comprising:

an annular unit including a plurality of annular metal plates which are put on one another;

a first group of bolt bores formed through said annular unit;

a second group of bolt bores formed through said annular unit;

a first group of bolts and nuts which are incorporated with said first group of bolt bores to fix said annular metal plates;

a second group of bolts and nuts which are incorporated with said second group of bolt bores to fix said annular metal plates;

a first yoke which connects said first shaft to said first group of bolts and nuts;

a second yoke which connects said second shaft to said second group of bolts and nuts; and a stopper structure, arranged in the vicinity of each of said first and second groups of bolt holes, by which mutually contacting portions of at least two of said annular metal plates are suppressed from making a relative displacement therebetween, wherein said mutually contacting portions are depressed in one direction so that a depressed part of each contacting portion is intimately pressed into a neighboring contacting portion, thereby to establish a locked engagement therebetween, and wherein an outermost one of said mutually contacting portions is formed with a cut toward which the other contacting portions are depressed.

2. A coupling as claimed in claim 1, wherein each of said annular metal plates comprises:

a plurality of identical rounded portions each having a circular opening; and a plurality of identical connecting arm portions each extending between two of said rounded portions which are adjacent one another;

wherein the width of said connecting arm portion is smaller than that of the said rounded portion.

3. A coupling as claimed in claim 1, wherein said mutually contacting portions are scabrous surfaces possessed by said annular metal plates.

4. A coupling as claimed in claim 3, wherein at least one of opposed surfaces of each annular metal plate is of a scabrous surface.

5. A coupling as claimed in claim 1, wherein the bolt bores of said first and second groups of bolt bores are circumferentially arranged at evenly spaced intervals, and wherein each of said first and second groups of bolt bores consists of bolt bores which are positioned alternately.

6. A coupling as claimed in claim 5, wherein each of said first and second yokes is formed with branched arms through which said first and second yokes are connected to said first and second groups of bolts and nuts respectively.

7. A coupling for coupling first and second shafts, comprising:

an annular unit including a plurality of annular metal plates which are put on one another;

a first group of bolt bores formed through said annular unit;

a second group of bolt bores formed through said annular unit;

a first group of bolts and nuts which are incorporated with said first group of bolt bores to fix said annular metal plates;

a second group of bolts and nuts which are incorporated with said second group of bolt bores to fix said annular metal plates;

a first yoke having branched arms through which said first shaft is connected to said first group of bolts and nuts;

a second yoke having branched arms through which said second shaft is connected to said second group of bolts and nuts; and a stopper structure by which mutually contacting portions of at least two of said annular metal plates in the vicinity of said first and second groups of bolt holes are suppressed from making a relative displacement therebetween, wherein said mutually contacting portions are depressed in one direction so that a depressed part of each contacting portion is intimately pressed into a neighboring contacting portion, thereby to establish a locked engagement therebetween, and wherein an outermost one of said mutually contacting portions is formed with a cut toward which the other contacting portions are depressed.

8. A coupling for coupling first and second shafts, comprising:

an annular unit including a plurality of annular metal plates which are put on one another;

a first group of bolt bores formed through said annular unit;

a second group of bolt bores formed through said annular unit;

a first group of bolts and nuts which are incorporated with said first group of bolt bores to fix said annular metal plates;

a second group of bolts and nuts which are incorporated with said second group of bolt bores to fix said annular metal plates;

a first yoke which connects said first shaft to said first group of bolts and nuts;

a second yoke which connects said second shaft to said second group of bolts and nuts; and stopper means, arranged in the vicinity of each of said first and second groups of bolt holes, by which mutually contacting portions of at least two of said annular metal plates are suppressed from making a relative displacement therebetween, wherein said mutually contacting portions are depressed in one direction so that a depressed part of each contacting portion is intimately pressed into a neighboring contacting portion, thereby to establish a locked engagement therebetween, and wherein an outermost one of said mutually contacting portions is formed with a cut toward which the other contacting portions are depressed.

* * * * *